W. B. PETRON.
GRASS DESTROYER.
APPLICATION FILED JUNE 16, 1917.
1,256,725.
Patented Feb. 19, 1918.
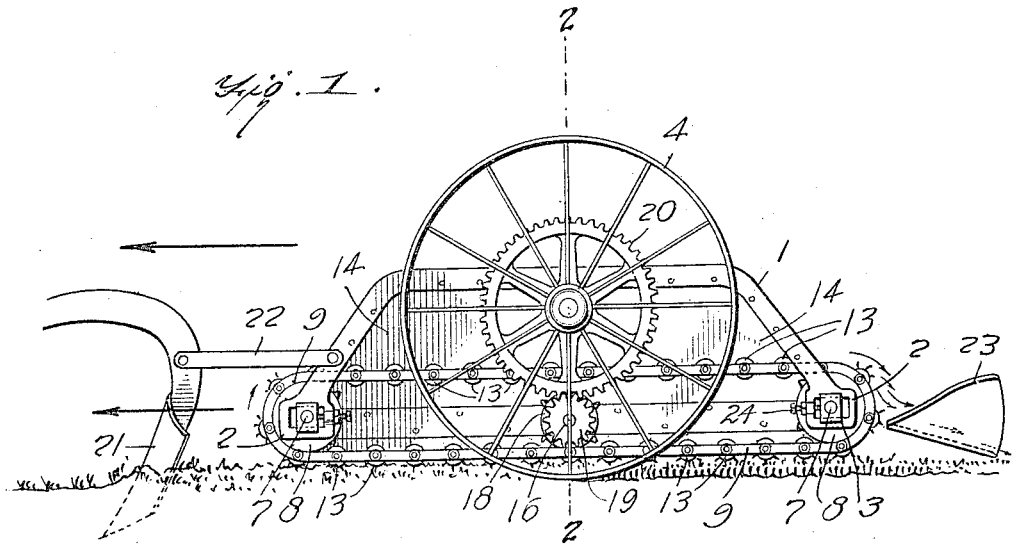
Fig. 1.
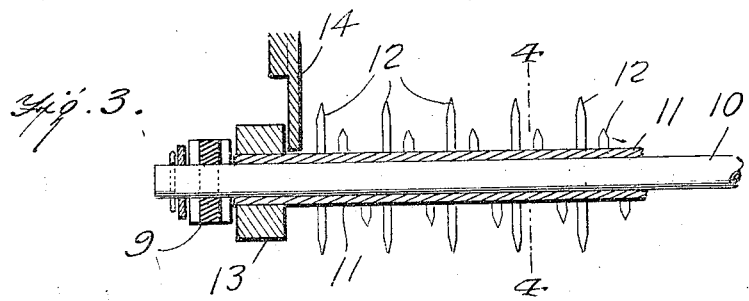
Fig. 3.
Fig. 4.
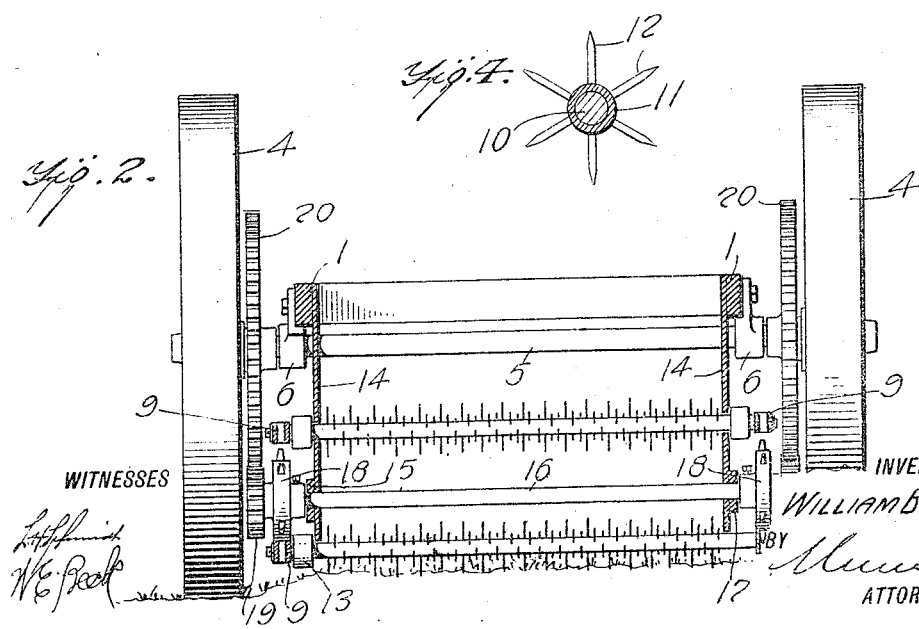
Fig. 2.
WITNESSES
INVENTOR
WILLIAM B. PETRON,
BY
ATTORNEYS

UNITED STATES PATENT OFFICE.

WILLIAM B. PETRON, OF NIAGARA, NORTH DAKOTA.

GRASS-DESTROYER.

1,256,725.

Specification of Letters Patent. Patented Feb. 19, 1918.

Application filed June 16, 1917. Serial No. 175,149.

*To all whom it may concern:*

Be it known that I, WILLIAM B. PETRON, a citizen of the United States, and a resident of Niagara, in the county of Grand Forks and State of North Dakota, have made certain new and useful Improvements in Grass-Destroyers, of which the following is a specification.

My invention is an improvement in grass destroyers, and has for its object to provide a machine of the character specified, for uprooting grass, and clearing it from the soil in order to destroy the grass.

In the drawing:
Figure 1 is a side view of the improved machine.

Fig. 2 is a section on the line 2—2 of Fig. 1.

Fig. 3 is an enlarged longitudinal section of one of the toothed rollers, and, Fig. 4 is a section on the line 4—4 of Fig. 3.

In the present embodiment of the invention, a frame is provided consisting of parallel longitudinally extending arch bars 1, the said bars having slots 2, in their ends, in which are arranged bearing blocks 3, the said blocks being slidable in the slots. The arch bears are supported by wheels 4, which are secured to the ends of an axle 5 journaled in bearings 6 on the undersides of the bodies of the arch bars.

Shafts 7 are journaled in the bearing blocks 3, and sprocket wheels 8 are secured to the ends of the shafts. Endless chains 9 are supported by the sprocket wheels, and these chains carry toothed rollers for a purpose to be presently described. Each of these rollers consists of a shaft 10, whose ends pivotally connect the links of the chain, as shown in Fig. 1, and a sleeve 11 is mounted on each shaft, each sleeve having radially extending teeth 12.

Rollers 13 are mounted on the ends of the sleeve. Sectional shield plates 14, 15, are secured to the arch bars, the said shield plates being inside of the rollers 13, and the sprocket wheels 8, and the said shield plates extend to about the level of the lower runs of the chain, to prevent the grass and dirt from falling on to the rollers and sprocket wheel. Each of these shield plates consists of an upper section 14 connected to the adjacent arch bar, and a lower section 15 connected at its ends to the arms of the arch bar the sections of each plate being spaced apart to form a passage through which the toothed rollers may pass on the upper runs of the chain.

A driving shaft 16 is journaled in plates 17 which are secured to the lower sections 15ª of the shield plates, and sprocket wheels 18 are secured to the ends of the shaft. These sprocket wheels engage the lower runs of the chains as shown in Fig. 2, and shaft 16 is driven by means of pinions 19, which are engaged by gear wheels 20 on the axle 5.

It will be evident that when the wheels 4 turn, the chains will be driven with their lower runs moving forwardly and in the direction of the arrows adjacent to the chains in Fig. 1.

A cultivator or gang plow 21 is arranged at the front of the frame, and connected thereto by links 22, and a suitable draft apparatus is connected to the beam of the plow. A mold board or deflector 23 is arranged at the rear of the frame for receiving the grass from the upper runs of the chains and deflecting the said grass to one side.

In operation, the machine is drawn through the field where the grass is to be destroyed, and the plows 21 stir the soil plowing up the grass. As the frame moves forward, the grass is caught by the teeth of the rollers, and is carried up on to the upper run of the dirt dislodging device, consisting of the toothed rollers and their connection, where the dirt is thoroughly loosened from the roots of the grass and the clean grass is finally delivered by the deflector 23 in a windrow at one side of the frame.

The shafts 7 may be moved away from each other to tighten the chains by means of set screws 24, which are threaded through lugs on the arms of the arch bars, and engage the bearing blocks 3.

I claim:

1. A machine of the character specified, comprising oppositely arranged longitudinally extending arch bars, shafts journaled in the ends of the arch bars, an axle journaled on the arch bars at the centers thereof, wheels on the ends of the axle, sprocket wheels on the ends of the shafts, endless chains supported by the wheels, toothed rollers extending between the chains and pivotally connecting the links thereof, each roller having at each end a wheel, means for moving the shafts away from each other to tighten the chains, a driving connection between the chains and the wheels, shield plates connected with the arch bars on the inner sides of the wheels of the rollers, and having passages for the rollers on the upper runs of the chains, plows connected with the front of the frame, and a deflector at the rear of the frame for deflecting the grass.

2. A machine of the character specified, comprising oppositely arranged frame bars, shafts journaled in the ends of the bars, wheels supporting the bars at the centers thereof, sprocket wheels on the ends of the shafts, endless chains supported by the sprocket wheels, toothed rollers extending between the chains, a driving connection between the chains and the wheels, plows at the front of the frame, and a deflector at the rear of the frame for deflecting the grass.

3. A machine of the character specified, comprising oppositely arranged frame bars, shafts journaled in the ends of the bars, wheels supporting the bars at the centers thereof, sprocket wheels on the ends of the shafts, endless chains supported by the sprocket wheels, toothed rollers extending between the chains, a driving connection between the chains and the wheels, and plows at the front of the frame.

4. A machine of the character specified, comprising oppositely arranged frame bars, shafts journaled in the ends of the bars, wheels supporting the bars at the centers thereof, sprocket wheels on the ends of the shafts, endless chains supported by the sprocket wheels, toothed rollers extending between the chains, and a driving connection between the chains and the wheels for driving the lower run of the chains forward.

WILLIAM B. PETRON.

Witnesses:
A. H. JOHNSON,
C. G. SKJERUEM.